US011583365B2

(12) United States Patent
Wen

(10) Patent No.: US 11,583,365 B2
(45) Date of Patent: *Feb. 21, 2023

(54) SYSTEM AND METHODS FOR TOOTH MOVEMENT AS A FLOCK

(71) Applicant: uLab Systems, Inc., Menlo Park, CA (US)

(72) Inventor: Huafeng Wen, Redwood Shores, CA (US)

(73) Assignee: uLab Systems, Inc., Memphis, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/230,170

(22) Filed: Aug. 5, 2016

(65) Prior Publication Data

US 2017/0100208 A1 Apr. 13, 2017

Related U.S. Application Data

(60) Provisional application No. 62/238,560, filed on Oct. 7, 2015.

(51) Int. Cl.
*A61C 7/00* (2006.01)
*G06F 30/00* (2020.01)

(52) U.S. Cl.
CPC .............. *A61C 7/002* (2013.01); *G06F 30/00* (2020.01)

(58) Field of Classification Search
CPC .................... A61C 7/002; A61C 2007/004
See application file for complete search history.

(56) References Cited

U.S. PATENT DOCUMENTS

| 3,521,355 | A | 7/1970 | Pearlman |
| 4,068,379 | A | 1/1978 | Miller et al. |
| 4,889,485 | A | 12/1989 | Iida |
| 4,983,334 | A | 1/1991 | Adell |
| 5,055,039 | A | 10/1991 | Abbatte et al. |
| 5,186,623 | A | 2/1993 | Breads et al. |
| 5,259,762 | A | 11/1993 | Farrell |
| 5,506,607 | A | 4/1996 | Sanders et al. |

(Continued)

FOREIGN PATENT DOCUMENTS

| CA | 2557573 | 7/2012 |
| CN | 1575782 | 2/2005 |

(Continued)

OTHER PUBLICATIONS

US. Appl. No. 15/230,139, filed Aug. 5, 2016.
(Continued)

*Primary Examiner* — Ralph A Lewis
(74) *Attorney, Agent, or Firm* — Levine Bagade Han LLP

(57) ABSTRACT

A system includes a plurality of tooth models each including computer code controlling its movement. The system also includes a tooth movement control system (TMCS) with a processor executing a dental manager module and with memory scoring a different tooth movement plan for each of the tooth models. In practice, the tooth movement plans are stored in the memory of each of the tooth models (e.g., a different tooth movement plan for each tooth model). Then, during tooth movement operation, each of the local control modules independently controls the tooth model to execute the tooth movement plan stored in the memory of the tooth model.

26 Claims, 2 Drawing Sheets

(56) References Cited

U.S. PATENT DOCUMENTS

| | | | |
|---|---|---|---|
| 5,691,905 A | 11/1997 | Dehoff et al. | |
| 5,863,198 A | 1/1999 | Doyle | |
| 5,975,893 A | 11/1999 | Chishti et al. | |
| 6,183,248 B1 | 2/2001 | Chishti et al. | |
| 6,210,162 B1 | 4/2001 | Chishti et al. | |
| 6,217,325 B1 | 4/2001 | Chishti et al. | |
| 6,227,850 B1 | 5/2001 | Chishti et al. | |
| 6,227,851 B1 | 5/2001 | Chishti et al. | |
| 6,250,918 B1 | 6/2001 | Sachdeva et al. | |
| 6,293,790 B1 * | 9/2001 | Hilliard | A61C 7/04 101/3.1 |
| 6,299,440 B1 | 10/2001 | Phan et al. | |
| 6,309,215 B1 | 10/2001 | Phan et al. | |
| 6,315,553 B1 | 11/2001 | Sachdeva et al. | |
| 6,386,878 B1 | 5/2002 | Pavlovskaia et al. | |
| 6,390,812 B1 | 5/2002 | Chishti et al. | |
| 6,394,801 B2 | 5/2002 | Chishti et al. | |
| 6,398,548 B1 | 6/2002 | Chishti et al. | |
| 6,454,565 B2 | 9/2002 | Phan et al. | |
| 6,463,344 B1 | 10/2002 | Pavloskaia | |
| 6,471,511 B1 * | 10/2002 | Chishti | A61C 7/00 |
| 6,485,298 B2 | 11/2002 | Chishti et al. | |
| 6,488,499 B1 | 12/2002 | Miller | |
| 6,524,101 B1 | 2/2003 | Phan et al. | |
| 6,554,611 B2 * | 4/2003 | Chishti | A61C 7/00 433/6 |
| 6,572,372 B1 | 6/2003 | Phan et al. | |
| 6,582,227 B2 | 6/2003 | Phan et al. | |
| 6,602,070 B2 | 8/2003 | Miller et al. | |
| 6,607,382 B1 | 8/2003 | Kuo et al. | |
| 6,626,666 B2 | 9/2003 | Chishti et al. | |
| 6,629,840 B2 | 10/2003 | Chishti et al. | |
| 6,682,346 B2 | 1/2004 | Chishti et al. | |
| 6,688,885 B1 | 2/2004 | Sachdeva et al. | |
| 6,699,037 B2 | 3/2004 | Chishti et al. | |
| 6,702,575 B2 | 3/2004 | Hilliard | |
| 6,705,861 B2 | 3/2004 | Chishti et al. | |
| 6,705,863 B2 | 3/2004 | Phan et al. | |
| 6,722,880 B2 | 4/2004 | Chishti et al. | |
| 6,729,876 B2 | 5/2004 | Chishti et al. | |
| 6,761,560 B2 | 7/2004 | Miller | |
| 6,783,360 B2 | 8/2004 | Chishti | |
| 6,786,721 B2 | 9/2004 | Chishti et al. | |
| 6,802,713 B1 | 10/2004 | Chishti et al. | |
| 6,830,450 B2 | 12/2004 | Knopp et al. | |
| 6,846,179 B2 | 1/2005 | Chapouland et al. | |
| 6,857,429 B2 | 2/2005 | Eubank | |
| 6,886,566 B2 | 5/2005 | Eubank | |
| 6,964,564 B2 | 11/2005 | Phan et al. | |
| 7,011,517 B2 | 3/2006 | Nicozisis | |
| 7,029,275 B2 | 4/2006 | Rubber et al. | |
| 7,037,108 B2 | 5/2006 | Chishti et al. | |
| 7,040,896 B2 | 5/2006 | Pavlovskaia et al. | |
| 7,056,115 B2 | 6/2006 | Phan et al. | |
| 7,059,850 B1 | 6/2006 | Phan et al. | |
| 7,063,533 B2 | 6/2006 | Phan et al. | |
| 7,074,038 B1 | 7/2006 | Miller | |
| 7,077,647 B2 | 7/2006 | Choi et al. | |
| 7,092,784 B1 | 8/2006 | Simkins | |
| 7,104,790 B2 | 9/2006 | Cronauer | |
| 7,121,825 B2 | 10/2006 | Chishti et al. | |
| 7,125,248 B2 | 10/2006 | Phan et al. | |
| 7,134,874 B2 | 11/2006 | Chishti et al. | |
| 7,156,661 B2 | 1/2007 | Choi et al. | |
| 7,160,110 B2 | 1/2007 | Imgrund et al. | |
| 7,172,417 B2 | 2/2007 | Sporbert et al. | |
| 7,192,275 B2 | 3/2007 | Miller | |
| 7,220,122 B2 | 5/2007 | Chishti | |
| 7,320,592 B2 | 1/2008 | Chishti et al. | |
| 7,326,051 B2 | 2/2008 | Miller | |
| 7,331,783 B2 | 2/2008 | Chishti et al. | |
| 7,347,688 B2 | 3/2008 | Kopelman et al. | |
| 7,416,407 B2 | 8/2008 | Cronauer | |
| 7,434,582 B2 | 10/2008 | Eubank | |
| 7,435,083 B2 | 10/2008 | Chishti et al. | |
| 7,442,041 B2 | 10/2008 | Imgrund et al. | |
| 7,458,812 B2 | 12/2008 | Sporbert et al. | |
| 7,476,100 B2 | 1/2009 | Kuo | |
| 7,553,157 B2 | 6/2009 | Abolfathi et al. | |
| 7,559,328 B2 | 7/2009 | Eubank | |
| 7,578,673 B2 | 8/2009 | Wen et al. | |
| 7,590,462 B2 | 9/2009 | Rubbert et al. | |
| 7,637,262 B2 | 12/2009 | Bailey | |
| 7,641,828 B2 | 1/2010 | Desimone et al. | |
| 7,658,610 B2 | 2/2010 | Knopp | |
| 7,689,398 B2 | 3/2010 | Cheng et al. | |
| 7,717,708 B2 | 5/2010 | Sachdeva et al. | |
| 7,771,195 B2 | 8/2010 | Knopp et al. | |
| 7,802,987 B1 | 9/2010 | Phan et al. | |
| 7,824,180 B2 | 11/2010 | Abolfathi et al. | |
| 7,826,646 B2 | 11/2010 | Pavlovskaia et al. | |
| 7,840,247 B2 | 11/2010 | Liew et al. | |
| 7,841,858 B2 | 11/2010 | Knopp et al. | |
| 7,845,938 B2 | 12/2010 | Kim et al. | |
| 7,854,609 B2 | 12/2010 | Chen et al. | |
| 7,878,801 B2 | 2/2011 | Abolfathi et al. | |
| 7,878,804 B2 | 2/2011 | Korytov et al. | |
| 7,878,805 B2 | 2/2011 | Moss et al. | |
| 7,883,334 B2 | 2/2011 | Li et al. | |
| 7,901,207 B2 | 3/2011 | Knopp et al. | |
| 7,905,724 B2 | 3/2011 | Kuo et al. | |
| 7,914,283 B2 | 3/2011 | Kuo | |
| 7,942,672 B2 | 5/2011 | Kuo | |
| 7,943,079 B2 | 5/2011 | Desimone et al. | |
| 7,957,824 B2 | 6/2011 | Boronvinskih et al. | |
| 7,987,099 B2 | 7/2011 | Kuo et al. | |
| 8,001,972 B2 | 8/2011 | Eubank | |
| 8,002,543 B2 | 8/2011 | Kang et al. | |
| 8,021,147 B2 | 9/2011 | Sporbert et al. | |
| 8,033,282 B2 | 10/2011 | Eubank | |
| 8,038,444 B2 * | 10/2011 | Kitching | A61C 7/00 433/213 |
| 8,070,487 B2 | 12/2011 | Chishti et al. | |
| 8,075,306 B2 | 12/2011 | Kitching et al. | |
| 8,099,268 B2 | 1/2012 | Kitching et al. | |
| 8,099,305 B2 | 1/2012 | Kuo et al. | |
| 8,105,080 B2 | 1/2012 | Chishti et al. | |
| 8,123,519 B2 | 2/2012 | Schultz | |
| 8,152,518 B2 | 4/2012 | Kuo | |
| 8,152,523 B2 | 4/2012 | Sporbert et al. | |
| 8,177,551 B2 | 5/2012 | Sachdeva et al. | |
| 8,235,713 B2 | 8/2012 | Phan et al. | |
| 8,272,866 B2 | 9/2012 | Chun et al. | |
| 8,275,180 B2 | 9/2012 | Kuo et al. | |
| 8,292,617 B2 | 10/2012 | Brandt et al. | |
| 8,303,302 B2 | 11/2012 | Teasdale | |
| 8,348,665 B2 | 1/2013 | Kuo | |
| 8,356,993 B1 | 1/2013 | Marston | |
| 8,401,686 B2 | 3/2013 | Moss et al. | |
| 8,401,826 B2 | 3/2013 | Cheng et al. | |
| 8,439,672 B2 | 5/2013 | Matov et al. | |
| 8,439,673 B2 | 5/2013 | Korytov et al. | |
| 8,444,412 B2 | 5/2013 | Baughman et al. | |
| 8,465,280 B2 | 6/2013 | Sachdeva et al. | |
| 8,469,705 B2 | 6/2013 | Sachdeva et al. | |
| 8,469,706 B2 | 6/2013 | Kuo | |
| 8,496,474 B2 | 7/2013 | Chishti et al. | |
| 8,512,037 B2 | 8/2013 | Andreiko | |
| 8,517,726 B2 | 8/2013 | Kakavand et al. | |
| 8,535,580 B2 | 9/2013 | Puttler et al. | |
| 8,562,337 B2 | 10/2013 | Kuo et al. | |
| 8,562,338 B2 | 10/2013 | Kitching et al. | |
| 8,562,340 B2 | 10/2013 | Chishti et al. | |
| 8,636,509 B2 | 1/2014 | Miller | |
| 8,636,510 B2 | 1/2014 | Kitching et al. | |
| 8,690,568 B2 | 4/2014 | Chapoulaud et al. | |
| 8,708,697 B2 | 4/2014 | Li et al. | |
| 8,734,149 B2 | 5/2014 | Phan et al. | |
| 8,734,150 B2 | 5/2014 | Chishti et al. | |
| 8,738,165 B2 | 5/2014 | Cinader, Jr. et al. | |
| 8,765,031 B2 | 7/2014 | Li et al. | |
| 8,777,611 B2 | 7/2014 | Cios | |
| 8,780,106 B2 | 7/2014 | Chishti et al. | |
| 8,807,999 B2 | 8/2014 | Kuo et al. | |

(56) References Cited

U.S. PATENT DOCUMENTS

| | | |
|---|---|---|
| 8,858,226 B2 | 10/2014 | Phan et al. |
| 8,864,493 B2 | 10/2014 | Leslie-Martin et al. |
| 8,899,976 B2 | 12/2014 | Chen et al. |
| 8,899,978 B2 | 12/2014 | Kitching et al. |
| 8,930,219 B2 | 1/2015 | Trosien et al. |
| 8,936,464 B2 | 1/2015 | Kopelman |
| 8,998,608 B2 | 1/2015 | Trosien et al. |
| 8,944,812 B2 | 2/2015 | Kuo |
| 8,961,173 B2 | 2/2015 | Miller |
| 8,986,003 B2 | 3/2015 | Valoir |
| 8,992,215 B2 | 3/2015 | Chapoulaud et al. |
| 9,004,915 B2 | 4/2015 | Moss et al. |
| 9,022,781 B2 | 5/2015 | Kuo et al. |
| 9,026,238 B2 | 5/2015 | Kraemer et al. |
| 9,060,829 B2 | 6/2015 | Sterental et al. |
| 9,107,722 B2 | 8/2015 | Matov et al. |
| 9,119,691 B2 | 9/2015 | Namiranian et al. |
| 9,161,823 B2 * | 10/2015 | Morton .................. A61C 7/00 |
| 9,161,824 B2 | 10/2015 | Chishti et al. |
| 9,204,942 B2 | 12/2015 | Phan et al. |
| 9,211,166 B2 | 12/2015 | Kuo et al. |
| 9,241,774 B2 | 1/2016 | Li et al. |
| 9,301,814 B2 | 4/2016 | Kaza et al. |
| 9,320,575 B2 | 4/2016 | Chishti et al. |
| 9,326,830 B2 | 5/2016 | Kitching et al. |
| 9,326,831 B2 | 5/2016 | Cheang |
| 9,333,052 B2 | 5/2016 | Miller |
| 9,345,557 B2 | 5/2016 | Anderson et al. |
| 9,351,809 B2 | 5/2016 | Phan et al. |
| 9,364,297 B2 | 6/2016 | Kitching et al. |
| 9,375,300 B2 | 6/2016 | Matov et al. |
| 9,414,897 B2 | 8/2016 | Wu et al. |
| 9,433,476 B2 | 9/2016 | Khardekar et al. |
| 9,492,245 B2 | 11/2016 | Sherwood et al. |
| 9,820,829 B2 | 11/2017 | Kuo |
| 9,844,420 B2 | 12/2017 | Cheang |
| 9,917,868 B2 | 3/2018 | Ahmed |
| 9,922,170 B2 | 3/2018 | Trosien et al. |
| 10,011,050 B2 | 7/2018 | Kitching et al. |
| 10,022,204 B2 | 7/2018 | Cheang |
| 10,335,250 B2 | 7/2019 | Wen |
| 10,357,336 B2 | 7/2019 | Wen |
| 10,357,342 B2 | 7/2019 | Wen |
| 10,548,690 B2 * | 2/2020 | Wen .................. A61C 7/08 |
| 10,588,723 B2 | 3/2020 | Falkel |
| 10,631,953 B2 | 4/2020 | Wen |
| 10,642,717 B2 | 4/2020 | Wen |
| 10,881,486 B2 | 1/2021 | Wen |
| 10,925,698 B2 | 2/2021 | Falkel |
| 10,952,821 B2 | 3/2021 | Falkel |
| 11,051,913 B2 | 7/2021 | Wen |
| 11,207,161 B2 | 12/2021 | Brant |
| 11,348,257 B2 | 5/2022 | Lang |
| 11,364,098 B2 | 6/2022 | Falkel |
| 11,553,989 | 1/2023 | Wen et al. |
| 2001/0002310 A1 | 5/2001 | Chishti et al. |
| 2002/0010568 A1 | 1/2002 | Rubbert et al. |
| 2002/0025503 A1 * | 2/2002 | Chapoulaud ............ A61C 7/00 |
| | | 433/24 |
| 2002/0042038 A1 | 4/2002 | Miller et al. |
| 2002/0072027 A1 | 6/2002 | Chisti |
| 2002/0094503 A1 | 7/2002 | Chishti et al. |
| 2002/0110776 A1 | 8/2002 | Abels et al. |
| 2002/0150859 A1 | 11/2002 | Imgrund et al. |
| 2002/0177108 A1 | 11/2002 | Pavlovskaia et al. |
| 2003/0003416 A1 | 1/2003 | Chishti et al. |
| 2003/0008259 A1 | 1/2003 | Kuo et al. |
| 2003/0039940 A1 | 2/2003 | Miller |
| 2003/0190576 A1 | 10/2003 | Phan et al. |
| 2003/0207224 A1 | 11/2003 | Lotte |
| 2004/0023188 A1 | 2/2004 | Pavlovskaia et al. |
| 2004/0029068 A1 | 2/2004 | Sachdeva et al. |
| 2004/0038168 A1 | 2/2004 | Choi et al. |
| 2004/0134599 A1 | 7/2004 | Wang et al. |
| 2004/0142299 A1 | 7/2004 | Miller |
| 2004/0152036 A1 | 8/2004 | Abolfathi |
| 2004/0166456 A1 | 8/2004 | Chishti et al. |
| 2004/0166462 A1 | 8/2004 | Phan et al. |
| 2004/0166463 A1 | 8/2004 | Wen et al. |
| 2004/0197728 A1 | 10/2004 | Abolfathi et al. |
| 2004/0202983 A1 | 10/2004 | Tricca et al. |
| 2004/0242987 A1 | 12/2004 | Liew et al. |
| 2004/0253562 A1 | 12/2004 | Knopp |
| 2005/0010450 A1 | 1/2005 | Hultgren et al. |
| 2005/0019721 A1 | 1/2005 | Chishti |
| 2005/0048432 A1 | 3/2005 | Choi et al. |
| 2005/0095552 A1 | 5/2005 | Sporbert et al. |
| 2005/0095562 A1 | 5/2005 | Sporbert et al. |
| 2005/0118555 A1 | 6/2005 | Sporbert et al. |
| 2005/0153255 A1 | 7/2005 | Sporbert et al. |
| 2005/0192835 A1 | 9/2005 | Kuo et al. |
| 2005/0238967 A1 | 10/2005 | Rogers et al. |
| 2005/0244781 A1 | 11/2005 | Abels et al. |
| 2005/0244782 A1 | 11/2005 | Chishti et al. |
| 2005/0271996 A1 | 12/2005 | Sporbert et al. |
| 2006/0003283 A1 | 1/2006 | Miller et al. |
| 2006/0035197 A1 | 2/2006 | Hishimoto |
| 2006/0068353 A1 | 3/2006 | Abolfathi et al. |
| 2006/0078840 A1 | 4/2006 | Robson |
| 2006/0078841 A1 | 4/2006 | Desimone et al. |
| 2006/0084030 A1 | 4/2006 | Phan et al. |
| 2006/0093982 A1 | 5/2006 | Wen |
| 2006/0099546 A1 | 5/2006 | Bergersen |
| 2006/0115785 A1 | 6/2006 | Li et al. |
| 2006/0147872 A1 | 7/2006 | Andreiko |
| 2006/0177789 A1 | 8/2006 | O'Bryan |
| 2006/0188834 A1 | 8/2006 | Hilliard |
| 2006/0199142 A1 | 9/2006 | Liu |
| 2006/0223022 A1 * | 10/2006 | Solomon .................. A61C 7/08 |
| | | 433/6 |
| 2006/0223023 A1 | 10/2006 | Lai et al. |
| 2006/0275731 A1 | 12/2006 | Wen et al. |
| 2006/0275736 A1 | 12/2006 | Wen et al. |
| 2007/0003907 A1 | 1/2007 | Chishti et al. |
| 2007/0238065 A1 | 10/2007 | Sherwood et al. |
| 2007/0264606 A1 | 11/2007 | Muha et al. |
| 2007/0283967 A1 | 12/2007 | Bailey |
| 2008/0032248 A1 | 2/2008 | Kuo |
| 2008/0044786 A1 | 2/2008 | Kailli |
| 2008/0050692 A1 | 2/2008 | Hilliard |
| 2008/0051650 A1 | 2/2008 | Massie et al. |
| 2008/0057461 A1 | 3/2008 | Cheng et al. |
| 2008/0057462 A1 * | 3/2008 | Kitching .................. A61C 7/00 |
| | | 433/24 |
| 2008/0076086 A1 * | 3/2008 | Kitching .................. A61C 7/00 |
| | | 433/24 |
| 2008/0085487 A1 | 4/2008 | Kuo et al. |
| 2008/0118882 A1 | 5/2008 | Su |
| 2008/0141534 A1 | 6/2008 | Hilliard |
| 2008/0182220 A1 * | 7/2008 | Chishti .................... A61C 7/00 |
| | | 433/24 |
| 2008/0206702 A1 | 8/2008 | Hedge et al. |
| 2008/0215176 A1 | 9/2008 | Borovinskih et al. |
| 2008/0233530 A1 | 9/2008 | Cinader |
| 2008/0248438 A1 | 10/2008 | Desimone et al. |
| 2008/0248443 A1 * | 10/2008 | Chishti .................... A61C 7/00 |
| | | 433/24 |
| 2008/0261165 A1 | 10/2008 | Steingart et al. |
| 2008/0268400 A1 | 10/2008 | Moss et al. |
| 2008/0280247 A1 | 11/2008 | Sachdeva et al. |
| 2008/0305451 A1 | 12/2008 | Kitching et al. |
| 2008/0305453 A1 | 12/2008 | Kitching et al. |
| 2009/0081604 A1 | 3/2009 | Fisher |
| 2009/0117510 A1 | 5/2009 | Minium |
| 2009/0191502 A1 * | 7/2009 | Cao ........................ A61C 7/002 |
| | | 433/24 |
| 2009/0269714 A1 | 10/2009 | Knopp |
| 2009/0280450 A1 | 11/2009 | Kuo |
| 2009/0291407 A1 | 11/2009 | Kuo |
| 2009/0291408 A1 | 11/2009 | Stone-Collonge et al. |
| 2010/0036682 A1 | 2/2010 | Trosien et al. |
| 2010/0055635 A1 | 3/2010 | Kakavand |
| 2010/0086890 A1 | 4/2010 | Kuo |
| 2010/0138025 A1 | 6/2010 | Morton et al. |

(56) References Cited

U.S. PATENT DOCUMENTS

| | | |
|---|---|---|
| 2010/0167225 A1 | 7/2010 | Kuo |
| 2010/0173266 A1 | 7/2010 | Lu et al. |
| 2010/0179789 A1 | 7/2010 | Sachdeva et al. |
| 2010/0280798 A1 | 11/2010 | Pattijn et al. |
| 2011/0005527 A1 | 1/2011 | Andrew et al. |
| 2011/0015591 A1 | 1/2011 | Hanson et al. |
| 2011/0020761 A1 | 1/2011 | Kailli |
| 2011/0039223 A1 | 2/2011 | Li et al. |
| 2011/0114100 A1 | 5/2011 | Alvarez et al. |
| 2011/0123944 A1 | 5/2011 | Knopp et al. |
| 2011/0129786 A1 | 6/2011 | Chun et al. |
| 2011/0159451 A1 | 6/2011 | Kuo et al. |
| 2011/0165533 A1 | 7/2011 | Li et al. |
| 2011/0269092 A1 | 11/2011 | Kuo et al. |
| 2011/0269097 A1 | 11/2011 | Sporbert et al. |
| 2011/0270588 A1 | 11/2011 | Kuo et al. |
| 2011/0281229 A1 | 11/2011 | Abolfathi |
| 2012/0035901 A1 | 2/2012 | Kitching et al. |
| 2012/0123577 A1 | 5/2012 | Chapoulaud et al. |
| 2012/0150494 A1 | 6/2012 | Anderson et al. |
| 2012/0186589 A1 | 7/2012 | Singh |
| 2012/0199136 A1 | 8/2012 | Urbano |
| 2012/0214121 A1 | 8/2012 | Greenberg |
| 2012/0225399 A1 | 9/2012 | Teasdale |
| 2012/0225400 A1 | 9/2012 | Chishti et al. |
| 2012/0225401 A1 | 9/2012 | Kitching et al. |
| 2012/0227750 A1 | 9/2012 | Tucker |
| 2012/0244488 A1 | 9/2012 | Chishti et al. |
| 2012/0270173 A1 | 10/2012 | Pumphrey et al. |
| 2012/0288818 A1 | 11/2012 | Vendittelli |
| 2013/0004634 A1 | 1/2013 | McCaskey et al. |
| 2013/0022255 A1 | 1/2013 | Chen et al. |
| 2013/0052625 A1 | 2/2013 | Wagner |
| 2013/0078593 A1 | 3/2013 | Andreiko |
| 2013/0081271 A1 | 4/2013 | Farzin-Nia et al. |
| 2013/0085018 A1 | 4/2013 | Jensen et al. |
| 2013/0095446 A1 | 4/2013 | Andreiko et al. |
| 2013/0122445 A1 | 5/2013 | Marston |
| 2013/0122448 A1 | 5/2013 | Kitching |
| 2013/0157213 A1 | 6/2013 | Arruda |
| 2013/0201450 A1 | 8/2013 | Bailey et al. |
| 2013/0204583 A1 | 8/2013 | Matov et al. |
| 2013/0230819 A1 | 9/2013 | Arruda |
| 2013/0231899 A1 | 9/2013 | Khardekar et al. |
| 2013/0236848 A1 | 9/2013 | Arruda |
| 2013/0266906 A1 | 10/2013 | Soo |
| 2013/0302742 A1 | 11/2013 | Li et al. |
| 2013/0308846 A1 | 11/2013 | Chen et al. |
| 2013/0317800 A1 | 11/2013 | Wu et al. |
| 2013/0323665 A1 | 12/2013 | Dinh et al. |
| 2013/0325431 A1* | 12/2013 | See ............... A61C 7/002 703/11 |
| 2014/0023980 A1 | 1/2014 | Kitching et al. |
| 2014/0072926 A1 | 3/2014 | Valoir |
| 2014/0073212 A1 | 3/2014 | Lee |
| 2014/0076332 A1 | 3/2014 | Luco |
| 2014/0122027 A1 | 5/2014 | Andreiko et al. |
| 2014/0124968 A1 | 5/2014 | Kim |
| 2014/0167300 A1 | 6/2014 | Lee |
| 2014/0172375 A1 | 6/2014 | Grove |
| 2014/0178830 A1 | 6/2014 | Widu |
| 2014/0193765 A1 | 7/2014 | Kitching et al. |
| 2014/0193767 A1 | 7/2014 | Li et al. |
| 2014/0229878 A1 | 8/2014 | Wen et al. |
| 2014/0242532 A1 | 8/2014 | Arruda |
| 2014/0255864 A1 | 9/2014 | Machata et al. |
| 2014/0272757 A1 | 9/2014 | Chishti |
| 2014/0287376 A1 | 9/2014 | Hultgren et al. |
| 2014/0288894 A1 | 9/2014 | Chishti et al. |
| 2014/0315153 A1 | 10/2014 | Kitching |
| 2014/0315154 A1 | 10/2014 | Jung et al. |
| 2014/0067335 A1 | 11/2014 | Andreiko et al. |
| 2014/0329194 A1 | 11/2014 | Sachdeva et al. |
| 2014/0349242 A1 | 11/2014 | Phan et al. |
| 2014/0358497 A1 | 12/2014 | Kuo et al. |
| 2014/0363779 A1 | 12/2014 | Kopelman |
| 2014/0370452 A1 | 12/2014 | Tseng |
| 2015/0004553 A1 | 1/2015 | Li et al. |
| 2015/0004554 A1 | 1/2015 | Cao et al. |
| 2015/0018956 A1 | 1/2015 | Steinmann et al. |
| 2015/0025907 A1 | 1/2015 | Trosien et al. |
| 2015/0044623 A1 | 2/2015 | Rundlett |
| 2015/0044627 A1 | 2/2015 | German |
| 2015/0057983 A1 | 2/2015 | See et al. |
| 2015/0064641 A1 | 3/2015 | Gardner |
| 2015/0093713 A1 | 4/2015 | Chen et al. |
| 2015/0093714 A1 | 4/2015 | Kopelman |
| 2015/0125802 A1 | 5/2015 | Tal |
| 2015/0128421 A1 | 5/2015 | Mason et al. |
| 2015/0157421 A1 | 6/2015 | Martz et al. |
| 2015/0182303 A1 | 7/2015 | Abraham et al. |
| 2015/0182321 A1 | 7/2015 | Karazivan et al. |
| 2015/0216626 A1 | 8/2015 | Ranjbar |
| 2015/0216627 A1 | 8/2015 | Kopelman |
| 2015/0238280 A1 | 8/2015 | Wu et al. |
| 2015/0238282 A1 | 8/2015 | Kuo et al. |
| 2015/0238283 A1 | 8/2015 | Tanugula et al. |
| 2015/0238284 A1 | 8/2015 | Wu et al. |
| 2015/0245887 A1 | 9/2015 | Izugami et al. |
| 2015/0254410 A1 | 9/2015 | Sterental et al. |
| 2015/0265376 A1 | 9/2015 | Kopelman |
| 2015/0289949 A1 | 10/2015 | Moss et al. |
| 2015/0289950 A1 | 10/2015 | Khan |
| 2015/0305830 A1 | 10/2015 | Howard et al. |
| 2015/0305831 A1 | 10/2015 | Cosse |
| 2015/0305919 A1 | 10/2015 | Stubbs et al. |
| 2015/0313687 A1 | 11/2015 | Blees et al. |
| 2015/0320518 A1 | 11/2015 | Namiranian |
| 2015/0320532 A1 | 11/2015 | Matty et al. |
| 2015/0335399 A1 | 11/2015 | Caraballo |
| 2015/0335404 A1 | 11/2015 | Webber et al. |
| 2015/0336299 A1 | 11/2015 | Tanugula et al. |
| 2015/0342464 A1* | 12/2015 | Wundrak ............... A61C 7/002 433/215 |
| 2015/0351871 A1 | 12/2015 | Chishti et al. |
| 2015/0359609 A1 | 12/2015 | Khan |
| 2015/0366638 A1 | 12/2015 | Kopelman et al. |
| 2015/0368637 A1 | 12/2015 | Kopelman et al. |
| 2016/0000527 A1 | 1/2016 | Arruda |
| 2016/0008095 A1 | 1/2016 | Matov et al. |
| 2016/0008097 A1 | 1/2016 | Chen et al. |
| 2016/0051341 A1 | 2/2016 | Webber |
| 2016/0051342 A1 | 2/2016 | Phan et al. |
| 2016/0051348 A1 | 2/2016 | Boerjes et al. |
| 2016/0067013 A1 | 3/2016 | Morton et al. |
| 2016/0067014 A1 | 3/2016 | Kottemann et al. |
| 2016/0074137 A1 | 3/2016 | Kuo et al. |
| 2016/0074138 A1 | 3/2016 | Kitching et al. |
| 2016/0095668 A1 | 4/2016 | Kuo et al. |
| 2016/0095670 A1 | 4/2016 | Witte et al. |
| 2016/0106521 A1 | 4/2016 | Tanugula et al. |
| 2016/0120617 A1 | 5/2016 | Lee |
| 2016/0120621 A1 | 5/2016 | Li et al. |
| 2016/0128803 A1 | 5/2016 | Webber et al. |
| 2016/0135924 A1* | 5/2016 | Choi ............... A61C 7/08 433/6 |
| 2016/0135925 A1 | 5/2016 | Mason et al. |
| 2016/0135926 A1 | 5/2016 | Djamchidi |
| 2016/0135927 A1 | 5/2016 | Boltunov et al. |
| 2016/0157981 A1 | 6/2016 | Lee |
| 2016/0166363 A1 | 6/2016 | Varsano |
| 2016/0175068 A1 | 6/2016 | Cal et al. |
| 2016/0175069 A1 | 6/2016 | Korytov et al. |
| 2016/0184129 A1 | 6/2016 | Liptak et al. |
| 2016/0193014 A1 | 7/2016 | Morton et al. |
| 2016/0199216 A1 | 7/2016 | Cam et al. |
| 2016/0203604 A1 | 7/2016 | Gupta et al. |
| 2016/0206402 A1 | 7/2016 | Kitching et al. |
| 2016/0220200 A1 | 8/2016 | Sanholm et al. |
| 2016/0256240 A1 | 9/2016 | Shivapuja et al. |
| 2016/0310235 A1 | 10/2016 | Derakhshan et al. |
| 2016/0338799 A1 | 11/2016 | Wu et al. |
| 2016/0367339 A1 | 12/2016 | Khardekar et al. |
| 2017/0007359 A1 | 1/2017 | Kopelman et al. |

(56) References Cited

U.S. PATENT DOCUMENTS

| | | |
|---|---|---|
| 2017/0079748 A1 | 3/2017 | Andreiko |
| 2017/0100207 A1 | 4/2017 | Wen |
| 2017/0100209 A1 | 4/2017 | Wen |
| 2017/0100210 A1 | 4/2017 | Wen |
| 2017/0100211 A1 | 4/2017 | Wen |
| 2017/0100214 A1* | 4/2017 | Wen ............... A61C 7/002 |
| 2017/0325911 A1 | 11/2017 | Marshall |
| 2018/0014912 A1 | 1/2018 | Radmand |
| 2018/0028065 A1 | 2/2018 | Elbaz et al. |
| 2018/0042708 A1 | 2/2018 | Caron et al. |
| 2018/0055611 A1 | 3/2018 | Sun et al. |
| 2018/0078335 A1 | 3/2018 | Falkel |
| 2018/0078343 A1 | 3/2018 | Falkel |
| 2018/0078344 A1 | 3/2018 | Falkel |
| 2018/0078347 A1 | 3/2018 | Falkel |
| 2018/0092714 A1 | 4/2018 | Kitching et al. |
| 2018/0092715 A1 | 4/2018 | Kitching et al. |
| 2018/0158544 A1 | 6/2018 | Trosien et al. |
| 2018/0168781 A1 | 6/2018 | Kopelman et al. |
| 2018/0344431 A1 | 12/2018 | Kuo et al. |
| 2019/0008612 A1 | 1/2019 | Kitching et al. |
| 2019/0046297 A1 | 2/2019 | Kopelman et al. |
| 2019/0090987 A1 | 3/2019 | Hung |
| 2019/0231478 A1 | 8/2019 | Kopelman |
| 2019/0321135 A1 | 10/2019 | Wen |
| 2019/0343602 A1 | 11/2019 | Wen |
| 2019/0358002 A1 | 11/2019 | Falkel |
| 2019/0388189 A1 | 12/2019 | Shivapuja et al. |
| 2020/0000552 A1 | 1/2020 | Mednikov et al. |
| 2020/0047868 A1 | 2/2020 | Young et al. |
| 2020/0081413 A1 | 3/2020 | Georg et al. |
| 2020/0146775 A1 | 5/2020 | Wen |
| 2020/0170762 A1 | 6/2020 | Falkel |
| 2020/0205936 A1 | 7/2020 | Wen |
| 2020/0253693 A1 | 8/2020 | Wen |
| 2020/0316856 A1 | 10/2020 | Mojdeh et al. |
| 2020/0345459 A1 | 11/2020 | Schueller et al. |
| 2020/0357186 A1 | 11/2020 | Pokotilov et al. |
| 2021/0153981 A1 | 5/2021 | Falkel |
| 2021/0186668 A1 | 6/2021 | Falkel |
| 2021/0244518 A1 | 8/2021 | Ryu et al. |
| 2021/0282899 A1 | 9/2021 | Wen |
| 2021/0369417 A1 | 12/2021 | Wen et al. |
| 2021/0393376 A1 | 12/2021 | Wu et al. |
| 2022/0054232 A1 | 2/2022 | Wen et al. |
| 2022/0265395 A1 | 8/2022 | Falkel |
| 2022/0266577 A1 | 8/2022 | Sharma et al. |
| 2022/0409338 A1 | 12/2022 | Cao et al. |

FOREIGN PATENT DOCUMENTS

| | | |
|---|---|---|
| CN | 1997324 | 7/2007 |
| CN | 101427256 | 5/2009 |
| CN | 101636122 | 1/2010 |
| CN | 1973291 | 9/2010 |
| CN | 102438545 | 5/2012 |
| CN | 101528152 | 12/2012 |
| CN | 103932807 | 7/2014 |
| CN | 105748163 | 7/2016 |
| EP | 1474062 | 4/2011 |
| EP | 2056734 | 9/2015 |
| EP | 2957252 A1 | 12/2015 |
| HK | 40004866 B | 8/2022 |
| JP | 2005-515826 | 6/2005 |
| JP | 2006-500999 | 1/2006 |
| JP | 2008-532563 | 8/2008 |
| JP | 2009-202031 | 9/2009 |
| JP | 4323322 | 9/2009 |
| JP | 2010-50246 | 1/2010 |
| JP | 2010-528748 | 8/2010 |
| JP | 4566746 | 10/2010 |
| JP | 2012-139540 | 7/2012 |
| JP | 5015197 | 8/2012 |
| JP | 5015765 | 8/2012 |
| JP | 5149898 | 2/2013 |
| JP | 2013-081785 | 5/2013 |
| JP | 5291218 | 9/2013 |
| JP | 2007-525289 | 9/2017 |
| KR | 2004-46323 | 10/2009 |
| KR | 10-1450866 | 10/2014 |
| KR | 2018-0090481 | 8/2018 |
| WO | WO 2001/082192 | 11/2001 |
| WO | WO 2002/047571 | 6/2002 |
| WO | WO 2003/063721 | 8/2003 |
| WO | WO 2004/028391 | 4/2004 |
| WO | WO 2005/086058 | 9/2005 |
| WO | WO 2004/098379 | 11/2005 |
| WO | WO 2006/050452 | 5/2006 |
| WO | WO 2006/096558 | 9/2006 |
| WO | WO 2008/026064 | 3/2008 |
| WO | WO 2008/102132 | 8/2008 |
| WO | WO 2008/118546 | 10/2008 |
| WO | WO 2008/149222 | 12/2008 |
| WO | WO 2009/057937 | 5/2009 |
| WO | WO 2009/068892 | 6/2009 |
| WO | WO 2016/004415 | 1/2016 |
| WO | WO 2016/100577 | 6/2016 |
| WO | WO 2017/062207 | 4/2017 |
| WO | WO 2017/062208 | 4/2017 |
| WO | WO 2017/062209 | 4/2017 |
| WO | WO 2017/062210 | 4/2017 |
| WO | WO 2018/057622 | 3/2018 |
| WO | WO 2018/112273 | 6/2018 |
| WO | WO 2018/118200 | 6/2018 |
| WO | WO 2020/222905 | 11/2020 |
| WO | WO 2020/223384 | 11/2020 |
| WO | WO 2021/105878 | 6/2021 |
| WO | WO 2021/247145 | 12/2021 |
| WO | WO 2022/040671 | 2/2022 |
| WO | WO 2022/178514 | 8/2022 |

OTHER PUBLICATIONS

US. Appl. No. 15/230,193, filed Aug. 5, 2016.
US. Appl. No. 15/230,216, filed Aug. 5, 2016.
US. Appl. No. 15/230,251, filed Aug. 5, 2016.
US. Appl. No. 15/386,280, filed Dec. 21, 2016.
US. Appl. No. 15/710,469, filed Sep. 20, 2017.
US. Appl. No. 15/710,604, filed Sep. 20, 2017.
US. Appl. No. 15/710,666, filed Sep. 20, 2017.
US. Appl. No. 15/710,703, filed Sep. 20, 2017.
Kovach, I. V. et al., "Clinic, diagnosis, treatment, prevention, prosthetics various dentofacial anomalies and deformities," DMA, 2018.

* cited by examiner

SYSTEM AND METHODS FOR TOOTH MOVEMENT AS A FLOCK

CROSS-REFERENCE TO RELATED APPLICATIONS

This application claims the benefit of priority to U.S. Provisional Application No. 62/238,560 filed Oct. 7, 2015, which is incorporated herein by reference in its entirety.

FIELD OF THE INVENTION

The present invention relates to methods and apparatus for computerized orthodontics. More particularly, the present invention relates to methods and apparatus for planning orthodontic treatments.

BACKGROUND OF THE INVENTION

Orthodontics is a specialty of dentistry that is concerned with the study and treatment of malocclusions which can result from tooth irregularities, disproportionate facial skeleton relationships, or both. Orthodontics treats malocclusion through the displacement of teeth via bony remodeling and control and modification of facial growth.

This process has been traditionally accomplished by using static mechanical force to induce bone remodeling, thereby enabling teeth to move. In this approach, braces having an archwire interface with brackets are affixed to each tooth. As the teeth respond to the pressure applied via the archwire by shifting their positions, the wires are again tightened to apply additional pressure. This widely accepted approach to treating malocclusions takes about twenty-four months on average to complete, and is used to treat a number of different classifications of clinical malocclusion. Treatment with braces is complicated by the fact that it is uncomfortable and/or painful for patients, and the orthodontic appliances are perceived as unaesthetic, all of which creates considerable resistance to use. Further, the treatment time cannot be shortened by increasing the force, because too high a force results in root resorption, as well as being more painful. The average treatment time of twenty-four months is very long, and further reduces usage. In fact, some estimates provide that less than half of the patients who could benefit from such treatment elect to pursue orthodontics.

Kesling introduced the tooth positioning appliance in 1945 as a method of refining the final stage of orthodontic finishing after removal of the braces (debanding). The positioner was a one-piece pliable rubber appliance fabricated on the idealized wax set-ups for patients whose basic treatment was complete. Kesling also predicted that certain major tooth movements could also be accomplished with a series of positioners fabricated from sequential tooth movements on the set-up as the treatment progressed. However, this idea did not become practical until the advent of three-dimensional (3D) scanning and use of computers by companies including Align Technologies and as well as OrthoClear, Elementrix, and ClearCorrect to provide greatly improved aesthetics since the devices are transparent.

However for traditional trim model to individual tooth, the gum geometry is lost and the fake gum is recreated, often remodeled by a technician. Hence, the gum geometry may not be accurate at first and an animation of gum changes over time due to lack of a physical model is even harder to model. Such inaccurate modeling causes the resulting aligner to be mismatched resulting in devices which are too large or too small resulting in patient discomfort.

Another problem is that without the real gum as the reference, some so-called modeled treatments cannot be achieved in reality resulting in potential errors, e.g., a tooth movement can occur within a mis-modeled gingival, however, the tooth movement may actually be moved exteriorly of a patient's real gingival.

Another problem of trimming and hole filling and creating an individual tooth and gum model is there is little information that can define the real boundary of two teeth. Such trim and fill models force the boundary surfaces to be defined even if they are arbitrary.

Depending on what boundary surface is defined, the movement can be restricted or relax, meaning some real life movement can be achieved; however, due to such inaccuracies, the modeling software is unable to model accurately due to models colliding into each other. This may cause the real treatment outcome to create gaps between teeth and further requiring final refinements which increase cost and patient dissatisfaction. On the other hand, if the modeled movement is relax, the software may enable movements which are physically impossible in reality and this may cause the modeled device to push teeth into one another unable to move. This may also cause the plastic shell of the aligner to sometimes stretch so much that the shell applies an uncomfortable amount of force, which could be painful, to a patient.

Another problem of trim and hole fill is the filling of the geometry like a real tooth, for below, the below lines are likely of boundary surfaces modeled, such models look like a real tooth; however, such sharp boundaries cause deeper undercuts which, once printed and thermal formed to have a plastic shell, make removal of the plastic shell from the printed model difficult due to the deep undercuts. To compensate for this, a bevel object is typically created to fill the clevis increasing inaccuracy and costs.

Another problem of trim and hole filling is the model size is too large to communicate between the user and manufacturer thus requiring that the model size be reduced resulting in missing model details. These inaccuracies could misguide professionals, e.g., the full complex model may not show a gap between two adjacent teeth however the reduced model may show one.

These 3D scanning and computerized planning treatments are cumbersome and time consuming. Accordingly, there exists a need for an efficient and cost effective procedure for planning the orthodontic treatment of a patient.

SUMMARY OF THE INVENTION

The following description provides a control method and system for controlling two or more tooth models during synchronized tooth movement. As an exemplary use, the control method and system may be used to provide orthodontic treatment.

The system is provided for controlling tooth movement of a plurality of biological objects (tooth models). The system includes a plurality of tooth models each including computer code controlling its movement. The system also includes a tooth movement control system (TMCS) with a processor executing a dental manager module and with memory scoring a different tooth movement plan for each of the tooth models. In practice, the tooth movement plans are stored in the memory of each of the tooth models (e.g., a different tooth movement plan for each tooth model). Then, during tooth movement operation, each of the local control modules independently controls the tooth model to execute the tooth movement plan stored in the memory of the tooth model.

In some cases, the local control module of each of the tooth models operates to periodically compare a present position of the tooth model with the tooth movement plan and, based on the comparing, modifying control of the tooth model. In these cases, modifying of the control may include altering a tooth movement speed or selecting a new way point for the tooth model in the tooth movement plan as a target. In other cases, the local control of each of the tooth models may operate to detect another one of the tooth models within a safety envelope about the tooth model and, in response, communicate a collision warning message to the detected one of the tooth models to cause the detected one of the tooth models to alter its course to move out of the safety envelope. In some specific implementations, the tooth models are teeth, and the local control module of each of the tooth models operates to detect pitch and roll of the tooth and, when the pitch or the roll exceeds a predefined maximum, switches operations of the tooth to a safe operating mode.

The description also teaches a tooth movement control method. In this control method, an initial step may be to receive a tooth movement plan unique to each of the teeth for a plurality of teeth. A next step may involve concurrently operating the teeth to execute the tooth movement plans. The method further includes providing a communications channel between pairs of the teeth with a first one of the teeth detecting a second one of the teeth in a predefined space proximal to the first one of the teeth. The method also includes, with the first one of the teeth, transmitting a message to the second tooth over the communication channel between the first and second teeth causing the second tooth to change position to avoid collision.

In some implementations of the method, the tooth movement plans may include a plurality of way points for each of the teeth. In such implementations, the method may further include, during the operating of the teeth to execute the tooth movement plans, adjusting tooth movement speed or course of one of the teeth based on comparison of a present position and one of the way points. The tooth movement plans may further include an elapsed time period for each of the way points, and then, the adjusting of the tooth movement speed or course may be performed when the elapsed time is exceeded by the one of the teeth.

In some implementations of the method, the teeth movements are decomposed to different movement metrics, e.g. a tooth movement can be decomposed to tip, rotation around long axis, bodily movement, etc. The artificial intelligence network, usually a neural network is built, such network having different neurons and weights can be adjusted, where treated cases are the learning set of such neural network. By inputting each case and adjusting the network weights to make the network more predictable to the treatment outcome, when a new case comes, the designed movement may be run through the network and an ideal and more predictable movement design is achieved. The more training cases are provided, the more robust network can be achieved.

In one embodiment, each tooth executes rules that as a group conforms to one or more of the following goals or objectives:
1. Adherence to Andrews' Six Keys To Occlusion;
2. Root cannot move more than 0.5 mm per month;
3. Conform to a U or V formation;
4. Open the bite;
5. No interproximal reduction;
6. Avoid moving any implant tooth;
7. Define sub-group of teeth that move together as a unit.

The system allows close control by the treating professional at each stage by allowing specific movements from one stage to the next stage. In one example, it is desirable in some settings to synchronize the movement and operation of the tooth models to have tooth models operate in a choreographed manner as dictated by a treating professional, which is not possible through manual control where the tooth models move randomly and independently.

The present control method and/or system may be ideal for use in moving a number of tooth models and to provide synchronized tooth movement. Such a method would be non-swarming since it is desirable to avoid collisions and to also avoid the appearance of merely random movement (at least in some applications) of the tooth models. Rather, it is desirable for the tooth models to each react safely to environmental conditions such as changes in bone structure and soft tissue during group tooth movement of choreographed tooth models.

DETAILED DESCRIPTION OF THE INVENTION

Figure 1:
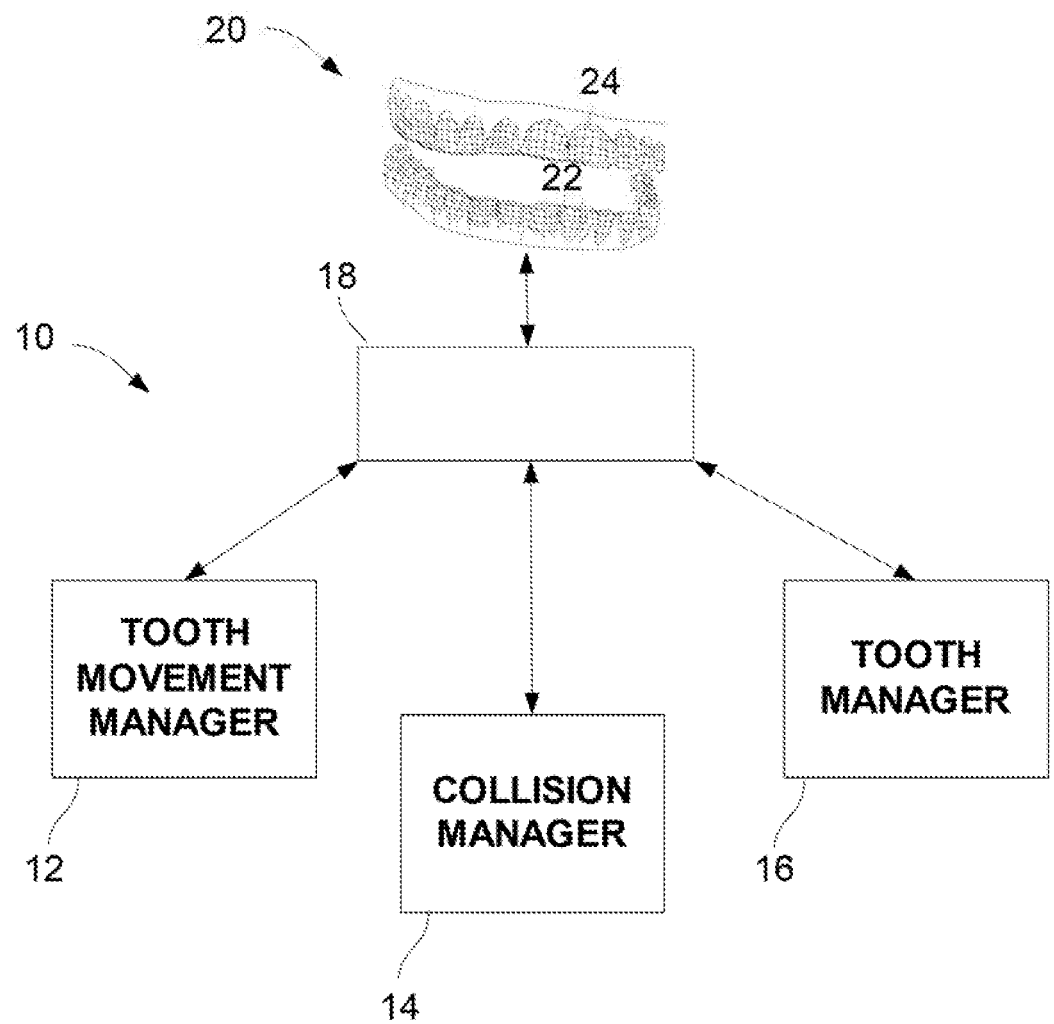
FIG. 1 is functional block diagram of a multiple tooth model system useful for implementing the tooth movement control techniques described herein.

The present invention will be described with respect to particular embodiments but the invention is not limited thereto but only by the claims. Any reference signs in the claims shall not be construed as limiting the scope thereof.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" when referring to recited members, elements or method steps also include embodiments which "consist of" said recited members, elements or method steps.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

The recitation of numerical ranges by endpoints includes all numbers and fractions subsumed within the respective ranges, as well as the recited endpoints.

All documents cited in the present specification are hereby incorporated by reference in their entirety.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. The terms or definitions used herein are provided solely to aid in the understanding of the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The treatment planning process may be implemented after receiving and analyzing the scanned dental model of a patient's dentition. The scanned dental model may be accordingly processed to enable the development of a treatment plan which can be readily implemented for fabricating one or more positioners for use in effecting sequential tooth movements. Generally, the tooth modeling process may be used in planning the treatment for correcting malocclusions in a patient and may involve initially acquiring a patient's dental record in the form of, e.g., lower arch and/or upper arch CAD files, intra oral photos, X-rays or 3D CT scans, etc. The lower arch and/or upper arch CAD files may be created, for instance, through a number of different methods, such as taking lower and upper impressions of the patient's dentition, X-rays, etc.

With the dental model, the present description is directed toward a control method and system (or multiple tooth model systems incorporating such control methods/systems) for use in controlling a flock of tooth models numbering from 2 to 10 or more tooth models (e.g., 10 to 100 or more teeth). That is, the method treats groups of teeth as a flock (e.g., such as a flock of birds which travel collectively) in planning the movements of the teeth for treatments to correct for malocclusions.

Briefly, the control method uses hierarchical-based supervisory control with multicasting techniques along with adaptive logic including onboard or local control modules provided on each tooth model to adjust tooth movement paths to safely avoid collisions based on communication with nearby tooth models. The result of the described control of the multiple tooth models in an oral cavity is a flocking behavior in which the tooth models appear to move in a synchronized manner with movements that are neither completely independent nor completely centrally controlled.

The control method in planning a treatment may be implemented in a system 10 generally having several components including a tooth movement manager module 12, collision manager module 14, and tooth manager module 16 for controlling the movement of tooth models. These components or aspects of the control method/system 10 communicate with a computer system 18 and are described below and as shown in FIG. 1.

FIG. 1 illustrates a tooth controller/computer or teeth movement control system (TMCS) 10 that may be used to control tooth movement in a safe and repeatable manner. The system 10 includes tooth movement manager module 12 which communicates with the computer system 18 (which includes one or more processors) upon which the digital tooth models of a patient's teeth 20 reside. As shown, the digital tooth models on the computer system 18 are configured for an inter-tooth model or tooth communications and, as explained herein, this intercommunication allows the teeth 20 to safely change its path for correcting malocclusions by determining whether particular teeth 22, 24 are in conflicting movement pathways to avoid collisions while generally remaining on a predefined tooth movement path.

During runtimes, the tooth movement manager 12 is programmed to send commands to the computer system 18 to monitor and maintain performance and quality and also to monitor safety of the teeth to be moved. The tooth movement manager 12 is further programmed to upload tooth movement requirements to the computer system 18 during downtimes, e.g., non-runtimes.

A second module, collision manager module 14, may be programmed to interact with the computer system 18 to handle collisions between teeth to be moved. The collision manager 14 may be programmed to perform the following logic: (a) calculate a "sphere of influence" on each tooth model, e.g., determine a proximity distance between each tooth model to trigger a collision event and if a tooth model enters this sphere of influence around a specific tooth model, a collision event is triggered; (b) determine through a nearest neighbor algorithm whether a possible conflicting pathway will occur; and (c) present to the operator on a user interface provided on the computer system 18 (e.g., via a monitor device) that a potential pathway conflict will occur between any two teeth. The collision module 14 may store the tooth movement paths in memory, e.g., within computer system 18.

Another module includes a tooth manager module 16 which is programmed to monitor the expected state and the actual state of each of the teeth 20. For example, the module 16 may compare a present position or traveling speed of, e.g., tooth 24, with its expected state which may be defined by a tooth movement path or a choreographed and/or time-synchronized movement of tooth models such as with a treatment animation. Based on this monitoring, the tooth manager module 16 may make adjustments such as using the following priorities: localization (e.g., position of the a tooth model with respect to another tooth model or teeth); environment (e.g., adjusting for bone conditions or the like); safety (e.g., returning the tooth model to a safe location or operating mode if the tooth model or other tooth models are not operating as expected); show performance (e.g., adjusting position, speed, or other operating parameters to meet show needs); tooth status; and operator convince/performance needs.

As discussed above, the tooth manager module 16, collision module 14, and tooth movement manager 12 are configured to work together to provide flocking-type control. In use, the inter-tooth model communications allows operational data to flow or spread hierarchically among each of the tooth models rather than relying upon centralized/tooth movement control alone. In other words, the tooth manager module 16 provides a level of centralized control or central logic that acts to control the movement of the tooth models/teeth such as by providing tooth movement paths provided by the tooth movement manager module 12 and/or making real-time adjustments based on a comparison of expected state and actual state (or for safety reasons) as provided by the collision manager module 14. With regard to inter-tooth model communications, it may be useful to note the following: (a) some units may be designated as master nodes talking with the tooth manager 16; and (b) the master nodes may operate to send out in-tooth movement calculated information or commands to remaining tooth models.

The movement of the individual tooth models and control of the models are not swarm-based in part because swarming-based tooth models can collide with one another or have an inherent lack of safety. The system 10 is designed to avoid random movements as the digital tooth models are subject to moving as a flock having synchronized movements among the individual tooth models. However, the inter-tooth model communications as processed and generated by the local control modules allow for each tooth model to react safely to environment conditions such as direction-changing and the presence/movement of neighboring teeth as crossing tooth movement paths is allowed in the system 10. In other words, the onboard logic acts to control the tooth movements so as to avoid collisions while attempting to stay generally on the tooth movement path.

Figure 2:
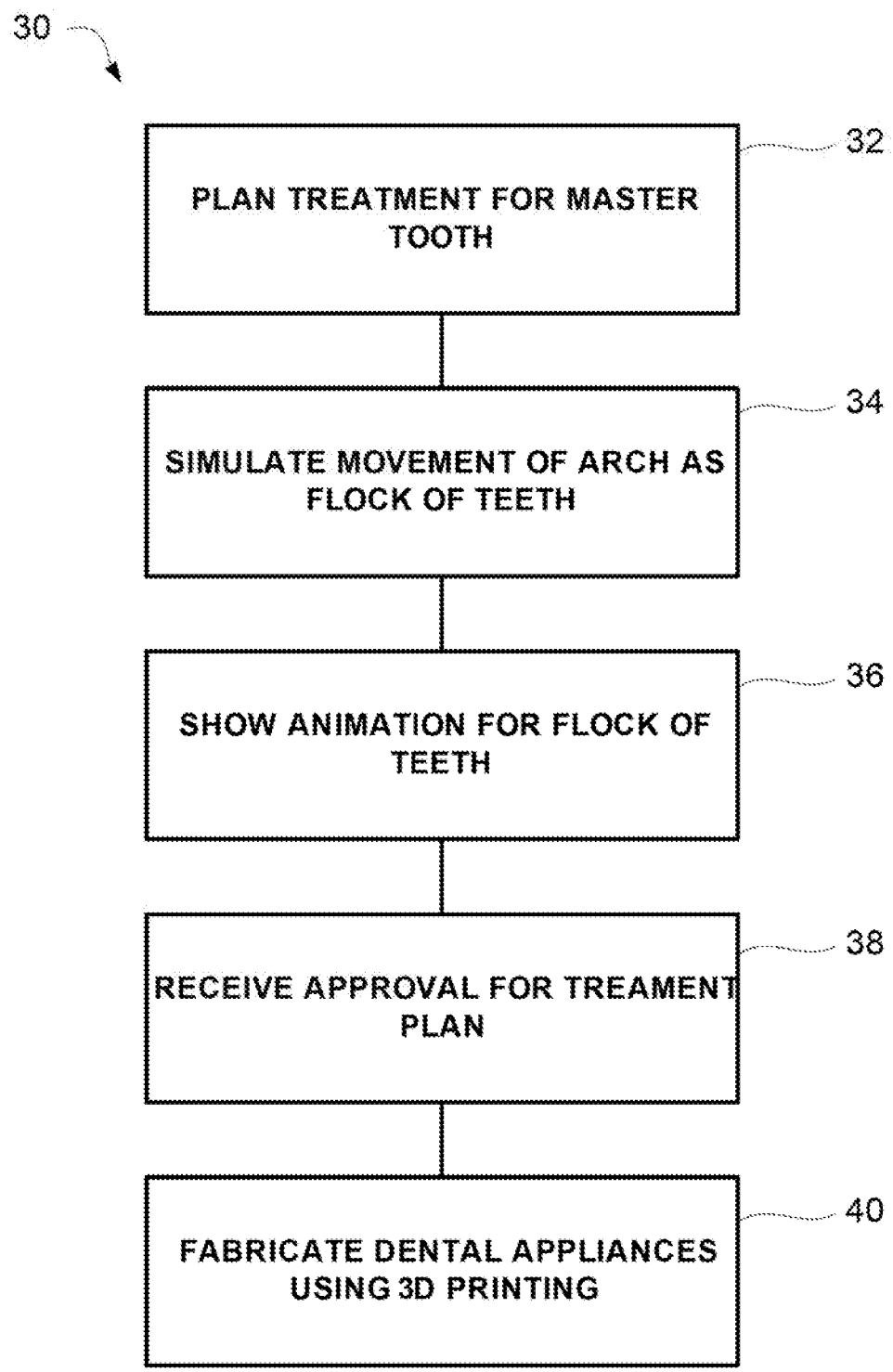
FIG. 2 is a functional schematic or block diagram of a system for use in providing tooth movement management or tooth movement control over two or more moving objects such as tooth models.

FIG. 2 illustrates a general system (or a tooth movement management control system) 30 generally for use in managing or controlling tooth models to provide for synchronized tooth movement by simulating flocking movement of the teeth to correct for malocclusions. As shown, a treatment plan for moving the one or more teeth 32 to correct for malocclusions may be initially developed. The system may include components used to perform off-line activity and used to perform on-line activity. The off-line activity may include designing or selecting a treatment concept or choreographed movement for a plurality of tooth models to achieve a particular effect or perform a task(s). The tooth movement concept (e.g., digital data stored in memory or the like) may be processed with a computer system 18 or other device.

Each tooth to be used may be modeled as a particle to simulate movement of the one or more teeth as a flock of teeth 34 (such as a flock of birds), as described herein. Accordingly, each digitized tooth model may be configured by the computer system 18 to define a three-dimensional space, such as a three-dimensional sphere with a predefined diameter, around each tooth model. This three-dimensional sphere may be used to define a safety envelope for the tooth model or flying object to reduce the risk of a collision between to individual tooth models. For instance, each of the tooth models may be created and create and choreographed by the system 18 to avoid collisions with one another and where two or more tooth models are prohibited from having their safety envelopes intersect or overlap as the tooth models move along their tooth movement paths.

The created tooth movement plan for the multiple tooth models is then exported to memory of computer system 18 or other devices for processing with this "treatment illustration" typically including a file per each tooth model. Each of these files is processed to generate real world coordinates for each tooth model to be achieved over time during an animation or performance of a choreographed task(s) to illustrate the movement of teeth 36, e.g., on a display, to the practitioner and/or patient. This processing creates individual tooth movement plans for each tooth model, and such processing or generating of the tooth movement plans may include processing the modeled animation based on specific logistical requirements. For example, these requirements may be modified, as needed, e.g., is the dental space the same size and shape as in the simulation and, if not, modification may be useful to change or set real world coordinates for one or more of the tooth models.

Once the treatment plan has been approved 38, the treatment plan may be used to fabricate one or more dental appliances or positioners using, e.g., three-dimensional printing 40, locally at the location of the treatment planning.

In planning the simulation of the movement of the individual tooth models as a flock of teeth 34 for working up a treatment plan, the tooth models may be manipulated using the TMCS 10 described herein. The logistical requirements may also include setting a tooth movement truth for the venue and adding safe or "home" points where each tooth can be safely positioned such as at the beginning and end of a treatment process or when a safety over-ride is imparted (e.g., "stop"). A treatment planning management component may he considered a component that translates central treatment plan controller commands where tooth actions are sent to the tooth management component either through scripts (e.g., data files), real time computer messages, and/or hardware triggers.

The tooth movement plans are provided to the TMCS 10, as described above, and the system further includes a number of tooth models shown in the form of teeth in this example. The teeth may be organized into groups or sets with a set shown to include, e.g., two molars, a set including one molars, and a set including cuspid teeth, among others. These sets may act or function together, at least for a portion of an animation or tooth movement path, to perform a particular display or task.

In other cases, all of the teeth may be considered part of large set that moves as a flock or otherwise has its movements time-synchronized and/or choreographed by tooth movement plans. A tooth in the group can communicate with its nearby or neighboring teeth so as to determine their presence, to determine their proximity, and when needed, to process the tooth movement plan, determine neighbor position, and other environmental data to modify their tooth movement plan to avoid collision and/or communicate with the neighboring tooth to instruct it to move or otherwise change its tooth movement plan/movement to avoid collision.

During pre-tooth movement, an operator uses the TMCS to load a tooth movement plan onto each tooth model. During a tooth movement sequence, the TMCS and its tooth manager module 16 acts to run the tooth movement plan previously loaded on the tooth model. During the tooth treatment, the TMCS actively monitors safety and a practitioner can initiate a TMCS user action. More typically, though, the TMCS monitors the operation of all the tooth models in the flock by processing telemetry data provided by each of the tooth models provided by each tooth model. In some embodiments, the tooth manager module 16 has software/logic that compares the actual state of each tooth model against the expected state at that particular time for the tooth model according to the presently enacted tooth movement plan.

After the "go" or start signal is issued by the tooth manager module/TMCS upon an operator input, the TMCS along with the local control software/hardware on each tooth model work to safely perform the preloaded tooth movement plan/show. As discussed above, the control method and system combines centralized, control (e.g., to allow manual override for safety or other reasons during a show/tooth movement-based task) with smart tooth models to more effectively provide flock-type movement of the tooth models. In other words, the tooth models may each be given a particular tooth movement plan that they work towards over time (e.g., during an animation period) while attempting to respond to the unexpected presence of another tooth model within or near to their safety window (or safe operating envelope surrounding each tooth model such as a sphere of, e.g., 1 to 3 mm or the like, in which no other tooth model typically will travel to avoid collisions).

During operations, the TMCS is used to trigger each of the tooth models to begin their stored tooth movement plan starting from an initial start point, e.g., each tooth model may be placed at differing starting points. In some cases after the "go" is received by a tooth model, each tooth model uses its local control module (or other software/programming) to attempt to follow the tooth movement plan but with no time constraints. In other words, the tooth movement plan may define a series of points or way points for the tooth model. In these embodiments, the tooth model is controlled in a relatively fluid manner and not tied to accomplishing specified movements in a certain amount of time, e.g., the tooth movement plan does not require the tooth model to be at a particular location at a particular time after the go signal is received hence allowing for planning flexibility.

In some implementations, the tooth movement plan may be built up assuming that each tooth model travels at a preset and constant tooth movement speed. This tooth movement speed may be set independently for each tooth model or may be the same (or within a relatively small range) for each of the tooth models. In other cases, though, the local control module may be adapted to adjust the tooth movement speed to suit the conditions in the mouth of the patient. The bone hardness may be determined at the tooth model with the local control module and/or via optical sensors for detecting actual tooth movement (rather than planned movement) may be provided by the TMCS to each of the tooth model. In some cases, flock control is preferred such that each tooth model has its speeds adjusted commonly, e.g., each tooth model runs at similar tooth movement speeds while moving in a similar direction so as to appear to have synchronized and non-random movement.

In some embodiment, each tooth model may act independently to try to continue to follow its own tooth movement plan. Each tooth movement plan may differ in that each tooth model begins at a different start point or home and moves toward its first way point. To this end, each tooth model is equipped, as needed, to determine its present three dimensional position along with its present height above the gum line. The local control module uses this present position data to determine or modify, if necessary, its present direction or heading to continue to move toward the next way point in its tooth movement plan. This may involve changing it course and also its angle to reach the desired height at the way point.

An operator may take steps to manually override a particular one of the many tooth models to provide better control of that tooth model. For example, the tooth control module of the TMCS 10 may operate to compare an expected position of the tooth model with its actual position (provided via back end channel in its telemetry or other data). A warning may be provided in a graphical user interface (GUI) that the tooth model is trending off course or is outside an accepted tolerance for reaching its next way point.

For example, the GUI may show properly operating and positioned tooth models in a first color (e.g., green) and tooth models that are off course or out of position by a safe amount in a second color (e.g., yellow) and tooth models outside of a safe envelope in a third color (e.g., red). The red/unsafe tooth models may be handled automatically or manually to cause them to enter a safe mode of operation (e.g., return to home). The yellow tooth models that are operating outside of desired conditions may be manually operated to try to assist them in returning to their tooth movement path such as by manually changing speed, direction, angle of attack, or the like to more quickly bring the tooth model to a desired way point. After manual operations are complete, the control may be returned from the TMCS to the local control module for local control of the tooth model based on the tooth movement plan stored in its memory. The TMCS may be configured to evaluate collision issues and execute collision avoidance commands to preserve show quality (e.g., tooth movement performance) in degrading mouth conditions.

In other embodiments, a local control module of a tooth model may operate to adjust the tooth movement plan during tooth movement to better react to environmental conditions (such as toothache or temporarily gum discomfort, at least temporarily, off course). For example, a tooth movement plan may provide a time relative to a start time (when "go" was signaled by file TMCS to the tooth models) to reach each of its way points on the tooth movement plan. One embodiment may call for a tooth model to determine a distance to a next tooth model and its present estimated time of arrival. If the time of arrival is not within a window about a preset/goal arrival time, the local control module may act to increase the tooth movement speed of the tooth model such as by increasing the rate of rotation of a tooth. Likewise, if the tooth model is moving too quickly, the tooth model's local, control module may act to slow the tooth movement speed. In this manner, the movement of the tooth models may remain better synchronized to provide a flock control.

In other cases, though, the local control module of the tooth or other tooth models act to determine whether a way point was reached within a predefined time window with the tooth movement plan defining times for being at each way point relative to a start/go time. If not (e.g., the tooth model did not reach a way point at time "X" plus an allowable delay), the local control module may act to modify the tooth movement plan by directing the tooth model to skip the next way point and move directly to the way point within the mouth.

For example, a tooth movement plan may include way points A to Z. If a local control module determines that a predefined time window for way point C was not achieve, the local control module may skip or remove way point D from the tooth movement plan and cause the tooth model to take a direction/course (e.g., a straight line or other predefined path) to way point E. In this way, the tooth movement speed is maintained (e.g., all tooth models are moved at the same speed) while allowing the tooth model to "catch up" if they fall behind in their tooth movement plan (e.g., defining a set of way points to pass through or nearby within a predefined time period that may correspond with a time to perform a show/display or perform a task with the teeth).

With regard to safety and monitoring of operations, each tooth model may store a definition of a geofence that defines an outer perimeter (and an inner area in some cases) or boundary of a geographical area. The tooth models local control module compares the present position determined for the tooth model during a tooth movement and compares this position to the geofence. If this boundary is crossed (or is being approached such as within a preset distance from the geofence), the local control module may act to promptly return the tooth model back within the geofence boundaries. In other cases, the tooth model may be switched into a safe operating mode and this may cause the tooth model to return to a home position.

Further, regarding safe tooth model operations, some embodiments of tooth movement control may involve configuring the tooth models to have tooth model-to-tooth model (or tooth-to-tooth) communications to avoid collisions without reliance upon the TMCS to intervene. Each tooth model may use its local control module to operate on an ongoing basis to detect when another tooth model comes within a predefined distance from the tooth model such as within a sphere of 1 to 3 mm or the like. The first tooth model to detect such a condition (or both tooth models if a tie) generates a collision warning message and transmits this message to the offending/nearby tooth model to alter its course or present position to move out of the first tooth models dental space. For example, the tooth model receiving such a collision warning message may store an evasive action in its memory and initiate this action (a fixed movement such as angling to the right or left a preset angle). The evasion may be taken for a preset time period and then the tooth model may return to following its tooth movement plan (e.g., recalculate a course to the next way point from its new present location or the like).

In another example, the tooth models local control module monitors the present orientation of the tooth model and if the orientation is outside an acceptable range (e.g., tip or rotate exceeds 20 degrees or the like for a tooth) or if the bodily movement is too much, the local control module may also act to enter the tooth model into a safe operating mode (before or after attempting to correct the operating problem).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

As will be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described herein may be embodied in, and fully automated via, software code modules executed by one or more general purpose computers or processors, such as those computer systems described herein. The code modules may be stored in any type of computer-readable medium or other computer storage device. Some or all of the methods may alternatively be embodied in specialized computer hardware.

It should be emphasized that many variations and modifications may be made to the herein-described embodiments, the elements of which are to be understood as being among other acceptable examples. All such modifications and variations are intended to be included herein within the scope of this disclosure and protected by the following claims.

The applications of the devices and methods discussed above are not limited to the one described but may include any number of further treatment applications. Modification of the above-described assemblies and methods for carrying out the invention, combinations between different variations as practicable, and variations of aspects of the invention that are obvious to those of skill in the art are intended to be within the scope of the claims.

What is claimed is:

1. A computer-assisted method of controlling tooth movements for correcting malocclusions, comprising:
   receiving a plurality of digital tooth models of a subject having one or more malocclusions;
   determining a movement for each of the digital tooth models for correcting the malocclusions via a tooth movement manager module;
   assigning a three-dimensional sphere of influence having a predefined diameter assigned to each of the tooth models to define a safety envelope which surrounds each of the tooth models and to set a proximity distance between each tooth model via a collision manager module;
   monitoring an actual state of each tooth of the subject;
   comparing the actual state of each tooth against an expected state of each tooth model via a tooth manager module; and
   adjusting the movement of one or more teeth such that the movement of each of the one or more teeth is not tied to a specified movement within a predetermined number of stages over a specified period of time, and wherein the movement is based on a comparison of the actual state and the expected state showing the movement as trending off course.

2. The method of claim 1 wherein receiving a plurality of digital tooth models comprises scanning a dentition of the subject.

3. The method of claim 1 wherein determining a movement comprises independently executing a tooth movement plan for each of the tooth models.

4. The method of claim 3 wherein independently executing comprises concurrently triggering initiation of the treatment plans by the multiple tooth models.

5. The method of claim 1 wherein determining a movement comprises assigning one or more way points between an initial way point to a target way point.

6. The method of claim 5 wherein comparing the actual state comprises periodically comparing the actual state against the expected state at each of the one or more way points.

7. The method of claim 6 wherein adjusting the movement comprises assigning a new way point to one or more of the tooth models.

8. The method of claim 1 wherein adjusting the movement comprises adjusting a speed or course of the movement of the one or more teeth.

9. The method of claim 1 wherein adjusting the movement comprises adjusting based on interrelationships of skeletal and soft tissue.

10. The method of claim 1 wherein assigning a sphere of influence comprises assigning a space of 1 to 3 mm around each of the tooth models.

11. The method of claim 1 wherein assigning a sphere of influence further comprises monitoring for a collision between tooth models.

12. The method of claim 11 further comprising communicating a collision warning to an adjacent tooth model such that one or more of the tooth models alter their movement to avoid the collision.

13. The method of claim 1 further comprising determining if the one or more tooth models require a restart.

14. The method of claim 1 further comprising fabricating a plurality of dental appliances where each of the dental appliances is based on the movement of the one or more teeth.

15. The method of claim 14 wherein fabricating comprises fabricating via three-dimensional print.

16. A computer-implemented method of controlling tooth movements for correcting malocclusions, comprising:
receiving a plurality of digital tooth models of a subject having one or more malocclusions;
determining a movement for each of the digital tooth models for correcting the malocclusions via a tooth movement manager module;
assigning a three-dimensional sphere of influence having a predefined diameter assigned to each of the tooth models to define a safety envelope which surrounds each of the tooth models and to set a proximity distance between each tooth model via a collision manager module;
monitoring an actual state of each tooth of the subject;
comparing the actual state of each tooth against an expected state of each tooth model via a tooth manager module, wherein each tooth communicates with one or more neighboring teeth to determine relative proximity to one another;
if necessary, adjusting a tooth movement plan for each tooth based on a communication between each tooth and the one or more neighboring teeth so as to avoid a collision such that the movement of each of the one or more teeth is not tied to a specified movement within a predetermined number of stages over a specified period of time; and
adjusting the movement of the one or more teeth, wherein the movement is based on a comparison of the actual state and the expected state.

17. The method of claim 16 wherein receiving a plurality of digital tooth models comprises scanning a dentition of the subject.

18. The method of claim 16 wherein determining a movement comprises independently executing the tooth movement plan for each of the tooth models.

19. The method of claim 16 wherein determining a movement comprises assigning one or more way points between an initial way point to a target way point.

20. The method of claim 19 wherein comparing the actual state comprises periodically comparing the actual state against the expected state at each of the one or more way points.

21. The method of claim 20 wherein adjusting the movement comprises assigning a new way point to one or more of the tooth models.

22. The method of claim 16 wherein assigning a sphere of influence comprises assigning a space of 1 to 3 mm around each of the tooth models.

23. The method of claim 16 wherein assigning a sphere of influence further comprises monitoring for a collision between tooth models.

24. The method of claim 23 further comprising communicating a collision warning to an adjacent tooth model such that one or more of the tooth models alter their movement to avoid the collision.

25. The method of claim 16 wherein each tooth communications with one or more neighboring teeth to further determine environmental data for adjusting the tooth movement plan.

26. The method of claim 16 further comprising fabricating a plurality of dental appliances where each of the dental appliances is based on the movement of the one or more teeth.

* * * * *